United States Patent
Coluccia et al.

(10) Patent No.: US 6,998,069 B1
(45) Date of Patent: Feb. 14, 2006

(54) ELECTRODE MATERIAL FOR POSITIVE ELECTRODES OF RECHARGEABLE LITHIUM BATTERIES

(75) Inventors: Marcello Coluccia, Zurich (CH); Reinhard Nesper, Kilchberg (CH); Petr Novak, Brugg (CH)

(73) Assignee: Ferro GmbH, Frankfurt am Main (DE)

(*) Notice: Subject to any disclaimer, the term of this patent is extended or adjusted under 35 U.S.C. 154(b) by 0 days.

(21) Appl. No.: 10/149,032

(22) PCT Filed: Jan. 12, 2000

(86) PCT No.: PCT/CH00/00641
§ 371 (c)(1), (2), (4) Date: Oct. 22, 2002

(87) PCT Pub. No.: WO01/41238
PCT Pub. Date: Jun. 7, 2001

(30) Foreign Application Priority Data
Dec. 3, 1999 (CH) .................................. 2215/99

(51) Int. Cl.
- C01D 1/02 (2006.01)
- C01G 45/02 (2006.01)
- C01G 53/02 (2006.01)
- H01M 4/50 (2006.01)

(52) U.S. Cl. .................... 252/518.1; 423/35; 423/49; 423/594; 423/599; 429/223; 429/224; 427/126.3

(58) Field of Classification Search ................ 252/500, 252/518.1; 423/594, 599, 35, 49, 138, 179.5; 429/224, 223; 427/126.3
See application file for complete search history.

(56) References Cited

U.S. PATENT DOCUMENTS

| | | | |
|---|---|---|---|
| 5,609,975 A * | 3/1997 | Hasegawa et al. .......... 429/217 |
| 5,670,271 A | 9/1997 | Axmann ...................... 429/59 |
| 5,773,169 A | 6/1998 | Matsuda et al. ............. 429/223 |
| 6,395,250 B1 * | 5/2002 | Matsubara et al. ...... 423/594.4 |

FOREIGN PATENT DOCUMENTS

| | | |
|---|---|---|
| EP | 0 390 677 | 10/1990 |
| EP | 0556555 A1 | 8/1993 |
| EP | 0696075 A2 | 2/1996 |
| EP | 0849817 A2 | 6/1998 |
| EP | 0918041 A1 | 5/1999 |
| JP | WO 98/06670 * | 2/1998 |
| JP | 10097856 | 4/1998 |
| JP | 10-241691 * | 9/1998 |
| NZ | PCT/NZ99/00175 | 4/2000 |

OTHER PUBLICATIONS

Winter et al., "Insertion Electrode Materials for Rechargeable Lithium Batteries**," Adv. Mater. 1998, 10, No. 10, pp. 725-763.

(Continued)

*Primary Examiner*—Mark Kopec
*Assistant Examiner*—Kallambella Vijayakumar
(74) *Attorney, Agent, or Firm*—Rankin, Hill, Porter & Clark LLP

(57) ABSTRACT

The electrode material for positive electrodes of rechargeable lithium batteries is based on a lithium transition metal oxide. Said lithium transition metal oxide is a lithium transmission metal mixed oxide with at least two transition metals (for example nickel and/or manganese), has a layer structure and is doped (for example, with aluminium and/or boron). This inventive electrode material is characterized by a high cycle stability, yet is still economical to produce.

3 Claims, 1 Drawing Sheet

OTHER PUBLICATIONS

Figure 2:
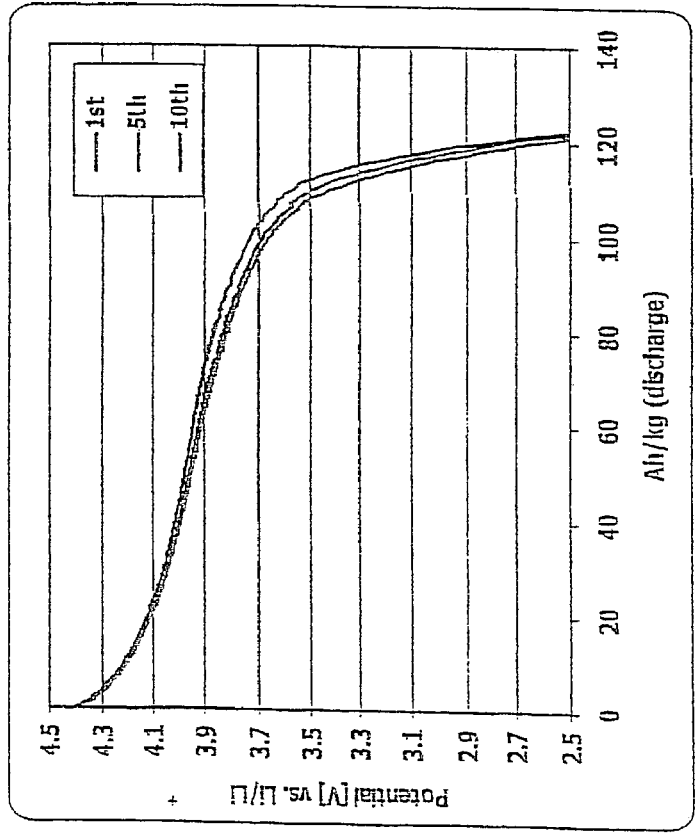

Spahr, "Synthese und Charakterisierung neuariger Oxide, Kohlenstoffverbindungen, . . . ," including five page English Abstract 1997.

*Chemical Abstracts, vol. 130, No. 5, 1998, Columbus Ohio, US; Abstract No. 54866, I. Matsubara, M. Ueda: "Manufacture of Lithium Nickel Oxide and Cathode Active Mass Using it for Secondary Lithium Batter" XP002135820 & JP 10 316431A (Fuji Chemical Industry Co. LL Japan) Dec. 20, 1998.

* cited by examiner

ELECTRODE MATERIAL FOR POSITIVE ELECTRODES OF RECHARGEABLE LITHIUM BATTERIES

The invention relates to an electrode material for positive electrodes of rechargeable lithium batteries, based on a lithium transition-metal oxide. The invention also relates to a method for the manufacture of such an electrode material.

Rechargeable lithium batteries are used especially in portable electronic equipment such as telephones, computers and video equipment. These applications place high demands on these batteries. In particular they should store the maximum amount of energy for a given volume or weight. They should also be reliable and environmentally-compatible. High energy density and high specific energy are thus two basic requirements which are placed in particular on the electrode material of such batteries.

A further important requirement for such electrode material is resistance to cycling. Here each cycle comprises one charging and discharge process. The resistance to cycling substantially determines the specific charge which is available after several cycles. Even with an assumed resistance to cycling of 99% in every cycle, the available specific charge after 100 cycles would be only 37% of the initial value. Even such a comparatively high value of 99% is therefore largely insufficient. A rechargeable suitable high-performance battery of the type described above should therefore be able not only to store a specific amount of energy at the lowest possible weight and volume, but should also have the ability to discharge and recharge this energy several hundred times. The critical factor here is to a large extent the electrode material.

On account of the major economic importance of such batteries, great efforts have been made to find electrode materials which meet the aforementioned requirements to the maximum extent.

To date, the materials used for the positive electrode of rechargeable lithium batteries have been in particular transition-metal oxides or transition-metal sulphides, organic molecules and polymers. In particular the transition-metal oxides and sulphides have proved successful in practice. Such materials are described as insertion electrode materials and are found in many batteries which are rechargeable at room temperature. The reason for the wider distribution of such materials lies in the fact that the electrochemical insertion reactions are simple and reversible.

The idea of a rechargeable battery based on lithium insertion reactions was developed in the 1970s. In the meantime, numerous electrodes based on this principle have been proposed and implemented. The rechargeability of lithium cells is based mainly on the dimensional stability of the guest material during the insertion and removal of $Li^+$.

As referred to above, transition metal oxides are known as easily reversible materials for positive electrodes. They include in particular lithium cobalt oxides, lithium nickel oxides, lithium manganese oxides, and lithium vanadium oxides. These materials are however to some extent unsuitable. Thus for example the lithium cobalt oxides are relatively expensive and not especially environmentally compatible. From the standpoint of environmental compatibility, the lithium manganese oxides would be particularly suitable. It has however been found that these oxides generally have a spinel structure which results in them having a lower specific charge or being unstable after removal of the lithium. Tests have also shown that, with the removal of lithium, orthorhombic lithium manganese oxide takes on a spinel structure. With regard to the prior art, reference is made here to the publication "Insertion Electrode Materials for Rechargeable Lithium Batteries" by Martin Winter, Jürgen O. Besenhard, Michael E. Sparh and Petr Novák in ADVANCED MATERIALS 1998, 10 Nov. no. 10, pages 725 to 763, and to dissertation ETH no. 12281 by M. E. Spahr, "Synthese und Charakterisierung neuartiger Oxide, Kohlenstoffverbindungen, Silicide sowie nanostrukturierter Materialien und deren elektro- und magnetochemische Untersuchung" ("Synthesis and characterization of new types of oxides, carbon compounds, suicides and nano-structured materials and their electro- and magneto-chemical analysis.").

The invention is based on the problem of providing an electrode material of the type described, which is characterised by greater resistance to cycling but is still cost-effective to produce and is also otherwise suitable for the production of rechargeable high-performance batteries. The electrode material should also be comparatively environmentally-compatible.

The problem is solved by an electrode material according to claim 1. Tests have shown that, with the electrode material according to the invention, it is possible to produce positive electrodes which are stable over hundreds of cycles or even improve in terms of their specific charge. This high resistance to cycling is surprising and represents a breakthrough in the efforts made over many years to improve materials for lithium batteries. The greater resistance to cycling allows an extension of battery life expectancy.

According to a development of the invention, the lithium transition-metal mixed oxide has nickel and or manganese as transition metals. With regard to environmental compatibility, the use of manganese in particular has proved to be advantageous. Manganese is appreciably more environmentally compatible than cobalt and also more economical. The electrode material is stable even with a relatively high manganese content.

According to a development of the invention, the lithium transition-metal mixed oxide has doped aluminium and/or boron. Transition-metal mixed oxide doped with aluminium and/or boron has proved to be especially resistant to cycling. The doping may be effected in an essentially known manner through precipitation with a salt. Doping with boric oxide, boric acid or lithium boron hydride has proved to be particularly advantageous. Lithium boron hydride is added dry and presumably incorporated protons are removed during doping with boron. Mixed doping with aluminium and boron is also suitable.

Doping is preferably carried out so that the lithium transition-metal mixed oxide is doped with 5–15 mol %.

Further advantageous features are disclosed by the dependent patent claims together with the description which follows.

The suitable electrode material has a two-dimensional layer structure similar to that of $LiNiO_2$ and has the general formula Li (MI) (MII) $O_2$, wherein M is a transition metal. Preferably the one metal is manganese and the other metal nickel. In the formula Li ($Mn_x Ni_{1-x}$) $O_2$, x lies in the range 0.05 to 0.5. The electrode material according to the invention thus has a layer structure. Spinel structures are ruled out. Small quantities (<0.05) of other transition metals may be advantageous.

Doping is effected in an intrinsically known manner by precipitation. Especially suitable are boric oxide, boric acid or lithium boron hydride. Doping with aluminium has also proved to be advantageous. Aluminium and boron may be doped separately or in varying proportions.

An electrode material with the composition $LiMn_{0.5}Ni_{0.4}Al_{0.1}O_2$ has been produced and tested. In respect of the specific charge (Ah/kg), this electrode material was stable as positive electrode over 200 cycles. The specific charge was constantly around 140 Ah/kg.

Figure 1:
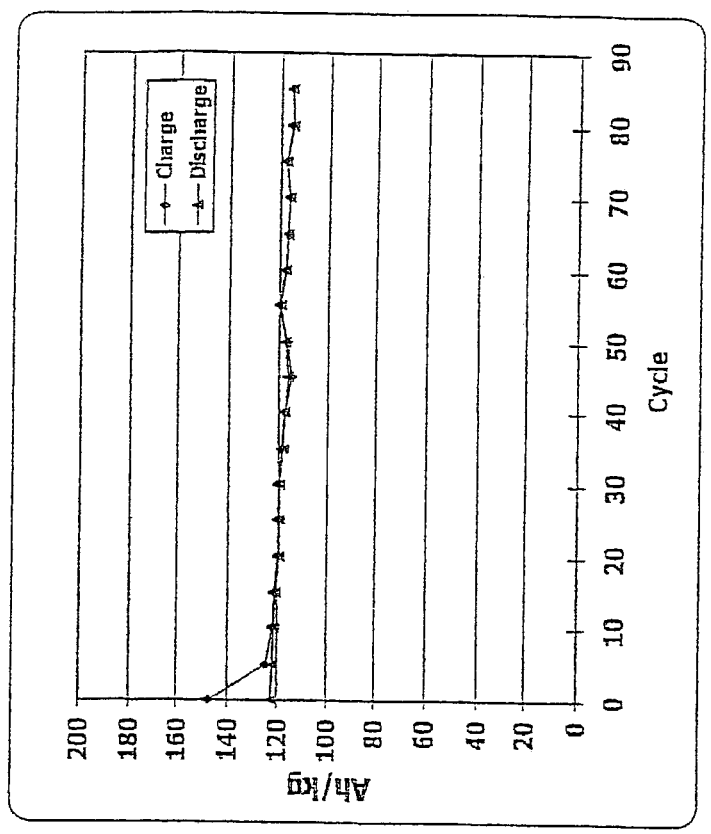

The electrochemical cycling behaviour of a typical aluminium-doped preparation is shown in FIG. 2. The insertion range is on average between 3.9 and 4 V. FIG. 1 also shows the galvanostatic discharge curve.

Thus, according to the invention, an electrode material is proposed which is not only stable but may also be produced economically and in addition is largely environmentally-compatible.

In a typical synthesis, molar amounts of the water-soluble metal salts (e.g. nitrate, acetate or hydroxide) are reacted in solution with stoichiometric quantities of LiOBr. The resulting precipitation is washed and dried several times, and lithium hydroxide is added to it. A slight surplus is advantageous, e.g. the amount of lithium is 1.2 times the metal content. The solid preparation is heated for between four hours and two days in an oxidative atmosphere, preferably in oxygen. Preferably the temperature at which the solid preparation is heated is less than 900° C., preferably around 800° C. It has been found that the useful properties deteriorate at temperatures significantly in excess of 900° C.

The invention claimed is:

1. A method of producing electrode material for positive electrodes of rechargeable lithium batteries having a layer structure, based on a lithium transition-metal oxide consisting essentially of lithium, manganese, nickel, and a dopant selected from the group consisting of aluminum and boron and combinations thereof, said method comprising:

reacting an acetate, nitrate or hydroxide of Mn and/or Ni with LiOBr to form a precipitate wherein the ratio of [moles Li: (moles Mn+moles Ni)]$\leq 1.2$ washing and drying the precipitate at least once adding LiOH to the precipitate heating the precipitate from 4 to 48 hours in an oxidative atmosphere at temperatures up to about 900° C.

2. A method of producing electrode material according to claim 1, wherein the lithium transition-metal mixed oxide is doped by means of alkali metal boron hydride, boric acid and/or boric oxide.

3. A method according to claim 1, wherein the lithium transition-metal mixed oxide is doped at least in part with aluminum.

* * * * *